Dec. 29, 1964   J. BROOKS   3,163,573
ARTIFICIAL TREE
Filed April 11, 1961
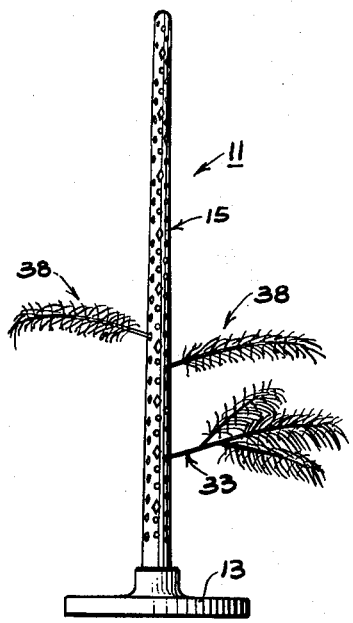
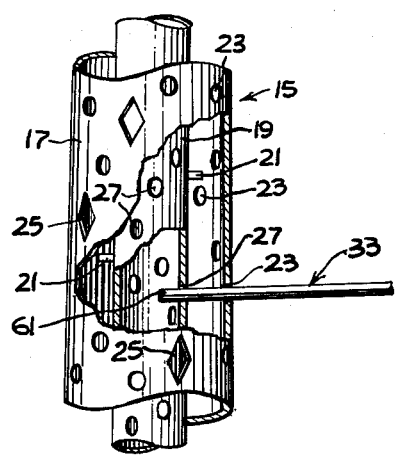
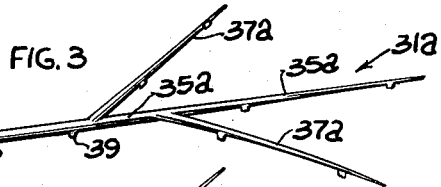
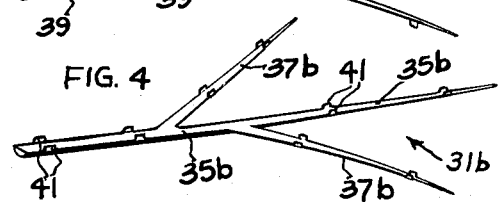
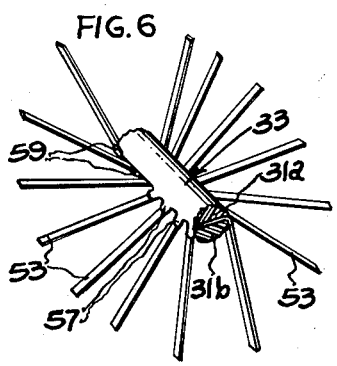
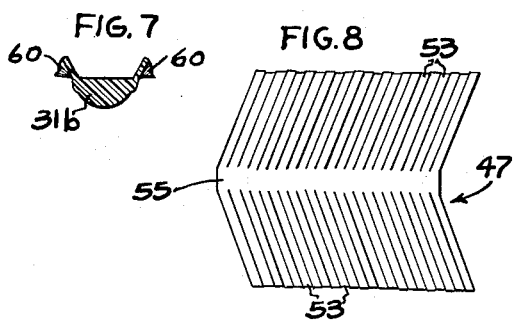
INVENTOR.
JACK BROOKS
BY John R. Walker, III
Attorney

United States Patent Office 3,163,573
Patented Dec. 29, 1964

3,163,573
ARTIFICIAL TREE
Jack Brooks, 3724 Briar Rose Road, Memphis, Tenn.
Filed Apr. 11, 1961, Ser. No. 102,158
5 Claims. (Cl. 161—24)

The present invention relates to a new and improved artificial tree for decorative purposes and particularly for use at Christmas time.

There have been other artificial trees heretofore contemplated, but in most of these prior trees, for any given type, the assembled tree has a uniform appearance, which does not permit any creativity on the part of the person doing the assembling. In contrast to this, the present invention is directed towards providing a "do-it-yourself" tree which can be assembled into various colors and shapes, depending upon the choice of the user.

Thus, one of the objects of the present invention is to provide a unique artificial tree which is adapted to receive different colored pieces of material to simulate the leaves or needles of the tree.

A further object is to provide such a tree which is adapted to be varied, as for example by adding branches to the tree, by varying the height thereof, or by changing the shape of the tree.

A further object is to provide such a tree that can easily be repaired.

A further object is to provide such a tree that can be conveniently stored in a relatively small space with the leaves and branches being in a flattened disposition.

A further object is to provide such a tree that is versatile and easily assembled and disassembled.

A further object is to provide such a tree that has a unique means for holding the material that simulates the leaves or needles of the tree.

A further object is generally to improve the design and construction of artificial trees.

The means by which the foregoing and other objects of the present invention are accomplished and the manner of their accomplishment will be readily understood from the following specification, upon reference to the accompanying drawings, in which:

FIG. 1 is a side elevational view of the artificial tree of the present invention, shown in a partially assembled disposition.

FIG. 2 is a fragmentary enlarged view of a portion of the tree trunk of the present invention, shown with parts broken away for purposes of illustration, and showing a fragmentary end of one of the branches inserted into the trunk.

FIG. 3 is a perspective view of the upper half of one of the branches.

FIG. 4 is a perspective view of the lower half of the same branch.

FIG. 5 is an enlarged cross sectional view showing the manner in which the upper and lower halves are clamped together.

FIG. 6 is an enlarged fragmentary perspective view of a portion of one of the branches showing a piece of foil clamped therebetween with the strips of the foil being shown in various angular positions, simulating the needles or leaves of the tree.

FIG. 7 is a cross sectional view of the lower half of one of the branches showing an alternate arrangement of the leaf positioning means.

FIG. 8 is a plan view of the foil material shown in a flat disposition for packing.

Referring now to the drawings in which the various parts are indicated by numerals, the tree 11 of the present invention comprises a suitable base 13, into which the lower end of the trunk 15 is removably inserted in a well-known manner.

Trunk 15 includes an outer tube 17 and an inner tube 19 inside of tube 17 and spaced therefrom, as best seen in FIG. 2. In other words, inner tube 19 is smaller in diameter than the inside diameter of outer tube 17 so that the tubes are spaced apart and are rigidly held in such position by suitable means, as for example brackets 21, extending between and respectively attached to the tubes; or, if desired, brackets 21 may be omitted and the tubes 17, 19 held apart adjacent the ends thereof by suitable well-known means. Tubes 17, 19 are respectively substantially cylindrical in shape, although each of the tubes is preferably slightly tapered respectively from adjacent the lower ends towards the upper ends thereof, as best seen in FIG. 1. Outer tube 17 is provided with a plurality of apertures 23 therethrough. In addition, outer tube 17 is preferably provided with a plurality of enlarged apertures 25 therethrough for a purpose later to be described. Inner tube 19 is also provided with a plurality of apertures 27 which are preferably of a similar size to apertures 23.

The branches of the tree 11 of the present invention are each formed in two halves, i.e., an upper half 31a, as best seen in FIG. 3, and a lower half 31b, as best seen in FIG. 4. It is contemplated that the branches be of different sizes and shapes without departing from the spirit and scope of the present invention. For example, referring to the branch 33, shown as the lower one in FIG. 1 and whose halves 31a, 31b are illustrated in FIGS. 3 and 4, the halves respectively include main portions 35a, 35b having smaller branches 37a, 37b extending angularly therefrom. Although in FIGS. 3 and 4 the main portions 35a and 35b are provided with two smaller branches 37a and 37b, it will be understood that more or less can be provided. In fact, it is contemplated that some of the whole branches each consist of a single main portion as shown in FIG. 1 at 38, with the smaller branches being omitted.

Pairs of ears 39 are attached to upper half 31a adjacent the opposite side edges thereof and extend generally downwardly. The groups of pairs of the ears 39 are spaced along the upper half of 31a. Similar pairs of ears 41 are attached to lower half 31b adjacent the side edges thereof and extend generally upwardly with ears 41 being spaced along the lower half in such positions that they will not interfere with ears 39 when the two halves 31a, 31b are brought together. The above described ears 39, 41 provide the means by which the upper and lower halves 31a, 31b are removably held together, and FIG. 5 shows how the halves are held together with the lower flat face 43 of upper half 31a being in flat face-to-face engagement with the upper flat face 45 of lower half 31b. In FIG. 5, the foil 47, which is later to be described, is not shown for purposes of clarity, but the two halves are shown clamped directly together rather than the foil being therebetween which is the case when the branch is assembled for use on the tree. It will be seen in FIG. 5 that ears 39 are arcuate and curve inwardly against the rounded surface 49 of lower half 31b. In a like manner the ears 41 are inwardly curved against the rounded surface 51 of upper half 31a, so that the two halves are held together. Ears 39, 41 are resilient so that the ears will be permitted to be forced outwardly at first as is necessary when halves 31a, 31b are brought together. Then, ears 39, 41 will snap into place, as shown in FIG. 5, to hold the two halves securely together. Resiliency is preferably provided by forming ears 39, 41 respectively integrally with halves 31a, 31b and by forming these parts from a suitable plastic or the like.

Between halves 31a, 31b is adapted to be held the foil 47, which preferably is formed from a suitable material as aluminum foil or the like that is shredded or cut along the opposite edges thereof to provide a plurality of narrow strips 53 extending angularly from an elongated mid-portion 55 of the foil, as best seen in FIG. 8. Although the preferable form of foil 47 is aluminum or the like, it will be understood that when the term "foil" is used it is not by way of limitation since it may be formed of suitable non-metallic materials without departing from the spirit and scope of the present invention. Mid-portion 55 is actually the part of foil 47 that is clamped between and contacted by the flat faces 43, 45, and this mid-portion is narrower in width than upper and lower halves 31a, 31b so that when the foil is clamped between the halves, strips 53 extend outwardly from adjacent opposite sides of the halves. It will be understood that the shape of foil 47 corresponds to the shape of the branch with which it is to be used. For example, the shape of foil 47 shown in FIG. 8 is for a straight branch, like branch 33; whereas, with a branch like branch 29 the mid-portion 55 of foil 47 would be forked to correspond to the forked shape of the branch. In other words, it is contemplated that foil 47 be preferably one unitary piece for each particular branch with the mid-portion 55 being shaped like the particular branch and with strips 53 extending from the mid-portion.

A plurality of protrusions 57 are preferably integrally provided on upper half 31a and depend downwardly therefrom at various angles from the opposite side edges of the upper halves. These protrusions 57 contact some of the strips 53 and urge the strips downwardly at various angles, as best seen in FIG. 6, so that the strips simulate leaves or needles of the tree projecting in various directions. In a similar manner, a plurality of protrusions 59 are preferably integrally formed on lower half 31b and project upwardly at various angles from the opposite side edges of the lower half to contact other of strips 53 which are not contacted by protrusions 57 and to urge these strips upwardly at various angles to further aid in simulating the needles or leaves of the tree. These protrusions 57, 59 are preferably, though not necessarily, spaced along the branches in a manner to correspond to the width of the strips 53 so that each of the protrusions contacts a strip. If desired, some of the protrusions 57, 59 may be omitted at spaced intervals along the length of the branches so that some of strips 53 will extend horizontally. It will be noted that all of protrusions 57, 59 have been omitted from FIGS. 3, 4 and 5 for the purposes of clarity. From the foregoing, it will be understood that protrusions 57, 59 act as positioning means for strips 53 to position the strips at the various angles. It is contemplated that the positioning means can be in other equivalent forms without departing from the spirit and scope of the present invention. For example, in FIG. 7 is shown an alternate and equivalent form wherein it will be seen that instead of having a plurality of individual spaced protrusions 59, a continuous spirally disposed protrusion 60 is provided on either side of lower half 31b. In other words, each of protrusions 60 is the same as the plurality of protrusions 59 with the spaces therebetween filled in to make a single solid protrusion. In a similar manner, solid protrusions may be formed on upper half 31a.

In addition, it should be understood that more than one foil 47, if desired, may be clamped between the halves of the branches without departing from the spirit and scope of the present invention. For example, foils 47 of different colors may be clamped between the halves of a particular branch thereby giving a very attractive effect and a greater quantity of leaves.

It is contemplated that in the packages which are sold to the customers, the pieces of foil 47 are packed in a flat disposition as shown in FIG. 8 with the foils being stacked one upon another and being provided in different colors. Thus, in assembling tree 11 the user selects the desired color of foil 47 and having selected a suitable branch of the desired shape and size, he clamps the foil between the two halves thereof, which causes the strips 53 to assume a disposition extending in various directions, as heretofore described. After the two halves have been clamped together securely in a manner as heretofore described, the inner end of the branch is inserted through a selected aperture 23 and then through an aperture 27, which will hold the branch in place on the tree. This is illustrated in FIG. 2 by the inner end 61 of branch 33 shown extended through apertures 23 and 27. It will be understood that the user need not select an aperture 27 which is in direct alignment with the particular aperture 23 selected, but he may select other apertures which are not in direct alignment so that the branch will be inclined at the desired angle. In addition, it will be understood that the user sights through enlarged apertures 25 to aid in inserting the end 61 in the aperture 27. The above described process of assembling the branches and inserting them into the trunk 15 is continued until the entire tree is formed.

It will be understood from the foregoing that a great deal of creativeness and skill on the part of the user can be utilized in making different sizes, shapes and colors of trees. As for example, the user can form a tree of one solid color of leaves, or he can have some leaves one color and some another. In addition, the user can add to his tree from year to year by buying additional branches and foils so that a fuller tree is formed at the will of the user.

In addition, it will be understood that the tree may be easily repaired, as for example, if any of the foils 47 should become damaged, rather than having to replace the entire branch, the upper and lower halves thereof can still be used with only the foil itself being replaced. Also, it will be understood that the tree of the present invention can easily be disassembled and the foils 47 flattened out so that they can be stored in a relatively small space for the next Christmas. This is a great advantage over other known types of artificial trees which, once they are assembled, are very difficult, if not impossible, to disassemble and particularly cannot be placed into a flat disposition as is the case with the present invention.

Although the invention has been described and illustrated with respect to a preferred embodiment thereof, it is to be understood that it is not to be so limited since changes and modifications may be made therein which are within the full intended scope of this invention as hereinafter claimed.

I claim:
1. In an artificial tree, an upstanding trunk, said trunk comprising an outer tube and an inner tube inside of said outer tube and spaced therefrom, said inner and outer tubes being respectively provided with apertures, a plurality of branches each having an inner end, said branches being respectively removably received in selected ones of said apertures with each branch having its inner end extending through one of the apertures in said outer tube and through one of the apertures in said inner tube; each of said branches comprising a pair of halves, a foil removably received between said pair of halves, and means removably clamping said foil therebetween, said foil being shredded to provide a plurality of narrow strips extending outwardly from said pair of halves, protrusion means on one of said halves contacting some of said strips to hold some of said strips at various angles, and additional protrusion means on the other of said halves contacting other of said strips to hold other of said strips at various angles.

2. In an artificial tree, an upstanding trunk, said trunk comprising an outer tube and an inner tube inside of said outer tube and spaced therefrom, said inner and outer tubes being respectively provided with apertures, a plurality of branches each having an inner end, said branches being respectively removably received in selected ones of said apertures with each branch having its inner end extending through one of the apertures in said outer tube and through one of the apertures in said inner tube; each of said branches comprising a pair of halves, a foil removably received between said pair of halves, and means removably clamping said foil therebetween, said foil being shredded to provide a plurality of narrow strips extending outwardly from said pair of halves, and protrusion means on said branches contacting some of said strips to hold some of said strips at various angles.

3. In an artificial tree, an upstanding trunk, said trunk comprising an outer tube and an inner tube inside of said outer tube and spaced therefrom, said inner and outer tubes being respectively provided with apertures, a plurality of branches each having an inner end, said branches being respectively removably received in selected ones of said apertures with each branch having its inner end extending through one of the apertures in said outer tube and through one of the apertures in said inner tube, said outer tube having a plurality of enlarged apertures therethrough for use in sighting through to insert said inner end through a selected aperture in said inner tube; each of said branches comprising an upper half, a lower half, a foil removably received between said upper and lower halves, and means removably clamping said foil therebetween, said foil being shredded to provide a plurality of narrow strips extending outwardly from said upper and lower halves, a plurality of protrusions on said upper half depending downwardly at various angles in contact with some of said strips to hold some of said strips at various angles, and a plurality of protrusions on said lower half extending upwardly at various angles in contact with other of said strips to hold other of said strips at various angles.

4. In an artificial tree, an upstanding trunk, said trunk comprising an outer tube and an inner tube inside of said outer tube and spaced therefrom, said inner and outer tubes being respectively provided with apertures, a plurality of branches each having an inner end, said branches being respectively removably received in selected ones of said apertures with each branch having its inner end extending through one of the apertures in said outer tube and through one of the apertures in said inner tube, said outer tube having a plurality of enlarged apertures therethrough for use in sighting through to insert said inner end through a selected aperture in said inner tube; each of said branches comprising an upper half, a lower half, a foil removably received between said upper and lower halves, and means removably clamping said foil therebetween, said foil being shredded to provide a plurality of narrow strips extending outwardly from said upper and lower halves, a continuous spirally disposed protrusion on said upper half in contact with some of said strips to hold some of said strips at various angles, and an additional continuous spirally disposed protrusion on said lower half in contact with other of said strips to hold other of said strips at various angles.

5. A branch for an artificial tree comprising an upper branch half, a lower branch half, a foil removably received between said upper and lower halves, means removably clamping said foil between said upper and lower halves, said foil being shredded to provide a plurality of narrow strips extending outwardly from said upper and lower halves, and protrusion means on said upper and lower halves contacting some of said strips to hold some of said strips at various angles.

References Cited by the Examiner
UNITED STATES PATENTS

| | | | |
|---|---|---|---|
| 1,240,392 | 9/17 | Vierlinger | 161—17 |
| 1,641,163 | 9/27 | Grant et al. | 41—15 |
| 1,933,495 | 10/33 | Howard | 41—15 |
| 1,991,602 | 2/35 | Dernehl | 41—10 |
| 2,072,560 | 3/37 | Kranz et al. | 41—10 |
| 2,149,968 | 3/39 | Kranz et al. | 41—15 |
| 2,889,650 | 6/59 | Hankus | 41—13 XR |
| 2,893,149 | 7/59 | Reece et al. | 41—15 |
| 3,030,720 | 4/62 | Osswald et al. | 161—17 |

EARL M. BERGERT, *Primary Examiner.*

CARL F. KRAFFT, HAROLD ANSHER, *Examiners.*